UNITED STATES PATENT OFFICE.

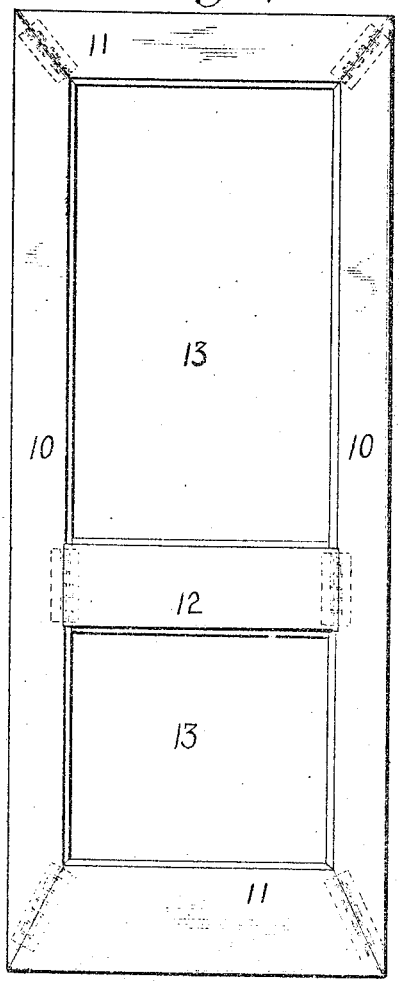
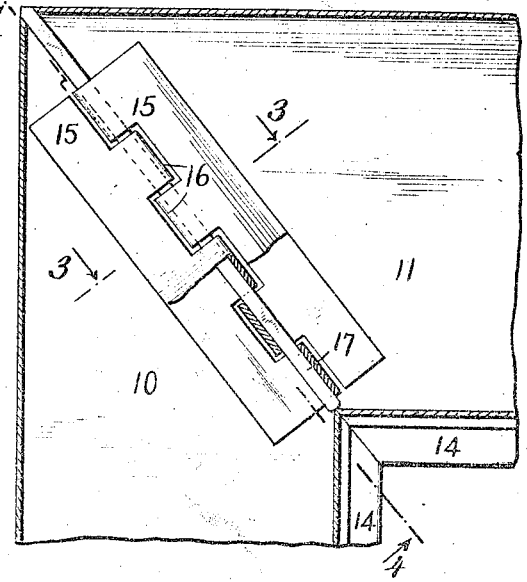
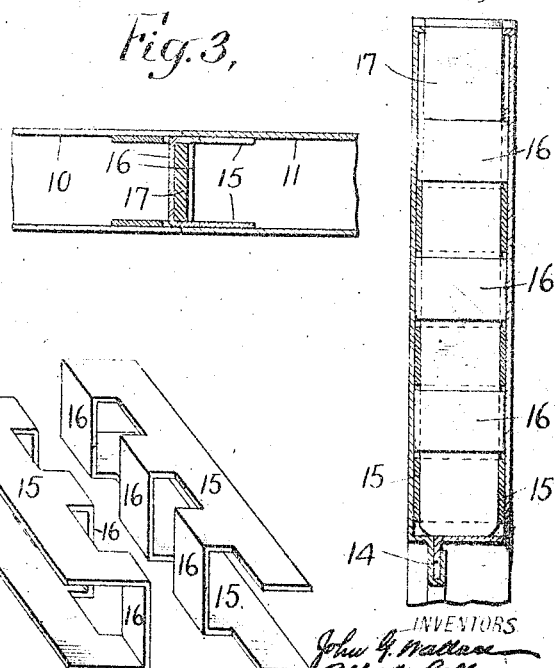

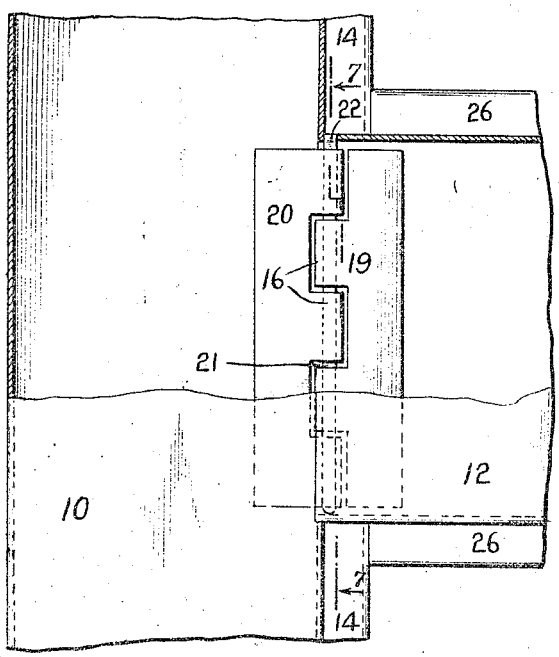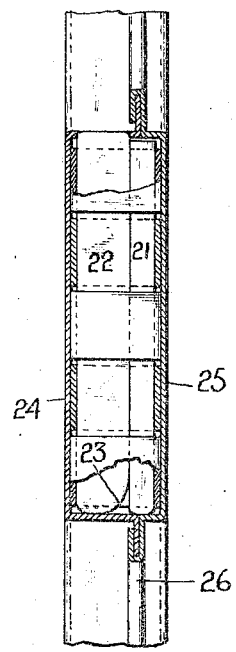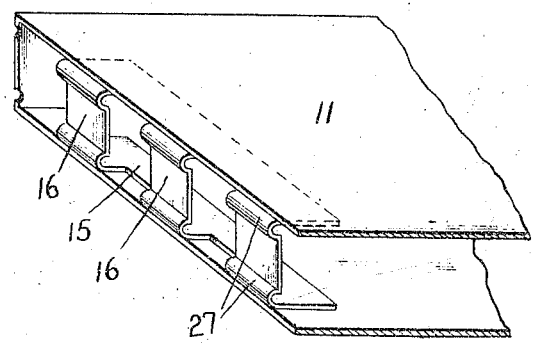

JOHN G. WALLACE AND ALFRED BELL, OF PHILADELPHIA, PENNSYLVANIA, ASSIGNORS TO HALE AND KILBURN COMPANY, OF PHILADELPHIA, PENNSYLVANIA, A CORPORATION OF DELAWARE.

DOOR.

1,156,950.  Specification of Letters Patent.  Patented Oct. 19, 1915.

Application filed November 6, 1913. Serial No. 799,430.

*To all whom it may concern:*

Be it known that we, JOHN G. WALLACE and ALFRED BELL, citizens of the United States, residing at Philadelphia, in the county of Philadelphia and State of Pennsylvania, have invented certain new and useful Improvements in Doors, of which the following is a specification.

This invention relates to doors made largely or entirely of sheet-metal and is directed to the provision of improved means for securing together the rails and stiles from which the frame of the door is made.

The object of the invention is to provide an improved construction for use in sheet-metal doors whereby ample strength is secured in a structure which may be manufactured at relatively low cost.

In the manufacture of sheet-metal doors heretofore, it has been common to form the rails and stiles and secure these together at their ends by welding or brazing them together or by securing them in any suitable manner to corner-boxes located within the corners of the frame. In accordance with the present invention, the ends of the outside stiles and rails are secured together by interlocking them one with another. Also the ends of the cross or intermediate rail or rails are interlocked with the coacting stiles intermediate the ends of the latter. For the purpose of such interlocking, securing devices are provided upon the end of each part projecting from the end of that part and adapted to enter within the end or through an opening of the coacting part. These securing devices are preferably in the form of loops or sheet-metal strips disposed transversely of the member to which they are secured and the loops on the adjacent ends of two adjacent frame-members are staggered so that they fit between each other. One or more keys are then inserted through the coacting loops so as to secure the two frame-members together. In this way, a very strong joint may be made, and the construction is such that doors employing the invention may be manufactured at comparatively low cost. For securing the ends of a cross rail to the members of the frame coacting therewith, a somewhat similar construction may be employed. The frame-members would have the transverse strips or loops formed thereon at the inner edge of the frame-member and between the ends of the latter for coaction with similar loops or strips on the end of the cross rail.

While the invention is of particular utility in connection with sheet-metal doors, we wish it understood that the invention is not limited in this respect, but may be employed in other devices, such for instance, as window sashes.

The preferred embodiment of the invention is illustrated in the accompanying drawings, in which—

Figure 1 is a front view of a door constructed in accordance with the invention, Fig. 2 is a section through one corner of the door showing the method of securing the ends of two adjacent frame-members together, Fig. 3 is a section on line 3—3 of Fig. 2, Fig. 4 is a section on line 4—4 of Fig. 2, Fig. 5 is a perspective view of the securing devices shown in Fig. 2 and the key coacting therewith, these three parts being separated so as to show their construction, Fig. 6 is a detail view partly in elevation and partly in section showing the construction employed at one end of the cross rail, Fig. 7 is a sectional view on line 7—7 of Fig. 6, Fig. 8 is a sectional detail view of a modification of the construction shown in the other figures and Fig. 9 is a detail view in perspective of the construction shown in Fig. 8.

Referring to these drawings, a door is shown in Fig. 1 having a frame consisting of stiles 10 and rails 11, a cross or intermediate rail 12 extending between the side-members of the frame and panels 13 secured within the frame. The rails and stiles are hollow and are made of sheet-metal by pressing sheet-metal strips of the requisite dimensions to a rectangular cross-section. The construction of these members may be changed as desired, but the construction shown herein is that which we prefer to employ. As here shown, each rail or stile is made from a single strip of sheet-metal by bending the same on lines extending lengthwise thereof to a rectangular cross-section and to form a flange at one edge of the strip inclosed by a fold at the opposite edge. This fold and the flange inclosed thereby form a flange 14 on the inner edge of the frame-member to which the panel 13 may be secured.

In order to secure the ends of two adjacent frame-members together, a securing device is applied to each of such ends, these being fitted within the open ends of the rail and stile respectively, and secured thereto in such position that a portion of each projects from the end of its frame member and is adapted to fit within the end of the adjacent frame member. The preferred construction of this securing device is that shown in Fig. 5. By reference to that figure, it will be seen that the securing device consists of a sheet-metal strip bent along lines extending lengthwise thereof to form two parallel sides 15 between which extend a plurality of connecting parts 16. These connecting parts 16 are separated by spaces of equal width, which spaces are provided by cutting rectangular openings in the strip from which the securing device is formed prior to bending it to the shape shown. With the securing device thus constructed, the sides 15 thereof are inserted within the end of a hollow rail 11, as indicated in Fig. 3, and are secured to the sides of that rail in such position that the connecting parts 16 project slightly beyond the end of the rail. These parts 16 when thus arranged form strips or loops disposed transversely with respect to the rail and extending between the sides of the rail. This securing device coacts with another securing device secured to the adjacent end of the adjacent stile 10. This other securing device is of the same construction as that above described and its position is reversed when applying it to the end of the stile to which it is secured. As a result, the connecting parts or loops 16 of one securing device lie opposite the spaces between the loops on the other securing device. When the ends of the stile and rail 10 and 11 are brought together, the loops 16 on the end of each member pass into the spaces between the loops on the end of the other member so that the parts are in the positions indicated by Figs. 2 and 3. A key 17 is then inserted through these loops. The parts are accurately made so that when the key 17 is driven through these loops, the members are brought together so that their mitered ends are drawn together to make a tight fit. If desired, the key 17 may be of such length that its outer end extends into the opening through which it was inserted, and is flush with the exterior surfaces of the coacting stile and rail. This construction is shown in Fig. 2 wherein the end of key 17 is shown as filed off so as to be flush with the surfaces of the outer edges of the stile and rail at the junction thereof. If desired, the key may be made slightly shorter and the material at the outer edges of the two members may be bent down upon the end of the key after the latter has been driven to its final position and these edges of the two members may then be welded together. Also, the flanges 14 on the two members may be secured together by welding if desired. In this way, a tight joint possessing great strength is secured by interlocking the ends of the two frame members rather than by securing them together by brazing or welding or employing screws or rivets to secure the ends of the members to cornerboxes. The mitered ends of the two members are drawn into close engagement and the material on these ends is supported by the securing device lying within the adjacent ends of the members.

Referring now to Figs. 6 and 7, the construction employed in securing the ends of the cross rail 12 to the stiles 10 will be described. Securing devices 19 similar to those above described are secured within the ends of the hollow cross rail 12 so that portions thereof project from the ends of the same and are adapted to enter within the side-members 10 of the frame. The material at the inner edge of each side-member 10 intermediate the ends of the side-member is cut away for a distance equal to the width of the cross rail 12 and in the opening thus provided in the stile 10 a securing device 20 is secured positioned so that a portion thereof projects from the stile, which portion is adapted to enter within the cross rail 12. These securing devices 19 and 20 have staggered loops 16 formed thereon in the manner above described. In securing this cross rail 12 to the stiles 10, two keys are employed instead of the one shown in Fig. 2. It will be apparent that if a key of the type shown in Figs. 2 to 5 were employed in connection with the cross rail 12, it would be necessary to cut away the flange 14 for a substantial distance on one side of the cross rail 12 to permit of inserting the key. Such cutting away of flange 14 would be highly undesirable because of the weakening effect on the structure and because it would detract from the appearance of the completed door. Two keys are therefore employed and these are both inserted through an opening provided therefor on one side of flange 14. This opening is indicated in Fig. 7. It is formed by cutting away the edge of the cross rail 12 at the end of the same and on one side of the flange 14 of the stile 10. A comparatively narrow key 21 is inserted through the opening thus provided and through the loops 16 in the securing devices 19 and 20 by a lengthwise movement of the key and when the key has been passed through all of the loops 16, it is moved laterally in those loops. A second key 22 is then inserted in the opening and moved lengthwise until it passes through all of the loops 16. The end of this key 22 is curved as shown at 23 so that the lengthwise movement of this key will force the key 21 laterally to the position it should occupy. The two keys 21 and 22 together are of a width equal to the width of the one key 17 and by using two such keys and inserting them in the manner above described, it is unnecessary to cut away the flange 14 of the stile 10 on either side of the cross rail 12.

The cross rail 12 is here shown as formed from two strips of sheet-metal 24 and 25, the former being flanged at its edges and the latter provided with folds which inclose these flanges so that flanges 26 are provided on both sides of the cross rail 12 similar to the flanges 14 on the inner sides of the stiles 10. In preparing the cross rail for coaction with the stiles 10, the ends of the flanges 26 are cut away for a distance back from the ends of the cross rail equal to the width of the flanges 14 as shown in Fig. 6.

In Figs. 8 and 9, a slight modification of the construction shown in the other figures is illustrated. The modification consists in the employment of two round keys instead of a single flat strip and the shaping of the securing devices to coact with the round keys. By reference to these figures, it will be seen that each loop 16 is bent near its ends to a semi-circular cross-section as shown at 27. These semi-circular parts on the strips 16 are adapted to receive keys 28 in the form of lengths of round wire. In other respects, this construction is like that above described.

Having described our invention, what we claim as new therein and desire to secure by Letters Patent of the United States is:

1. In a door, the combination of a frame comprising hollow sheet-metal stiles and rails, a stile and rail having abutting mitered ends, a pair of sheet-metal securing devices, secured respectively within the stile and rail at the adjoining ends thereof, each having parallel flanges secured to the inner surfaces of the side sheets of its frame member, with integral metal loops extending transversely between said flanges and within the adjacent frame member, the loops on one device extending into spaces between the loops on the other device, and a metal key inserted through all of said loops and lying within said frame parallel to the mitered joint of said rail and stile, and serving to maintain the mitered ends of said rail and stile in close engagement, said key being of such length as to extend between the inner and outer sheets of the frame, and to contact the same, substantially as set forth.

2. In a door comprising hollow sheet metal stiles and rails secured together, a pair of interlocking sheet-metal channels one having parallel flanges secured to the inner surfaces of the side sheets of a rail adjacent the end thereof, and integral loops extending between said flanges and into the interior of the adjacent stile, the other having parallel flanges secured to the inner surfaces of the side sheets of the stile to be connected to said rail, and having integral loops extending into spaces between the loops of the other channel, and metal key means inserted through all of said loops and serving to draw said stile and rail into close engagement, substantially as set forth.

3. In a door, two hollow frame-members, securing devices secured within the end of each of said members, projecting therefrom, and adapted to enter the other member, and two keys coacting with said securing devices to secure said members together, one of said keys being movable lengthwise and then laterally into securing position and the other key being movable lengthwise into securing position into space occupied by the other key prior to its lateral movement, substantially as set forth.

4. In a door comprising a frame made of stiles and rails, the combination of a hollow sheet-metal cross rail, a hollow sheet-metal stile, the intermediate portion of which is to be connected to the end of said rail, a sheet metal channel having flanges secured to the inner surfaces of the side sheets of the rail adjacent the end thereof, and integral loops extending between said flanges and through an opening formed in the stile into the interior of the latter, a sheet metal channel having flanges similarly secured within the stile, adjacent said opening, and having integral loops extending through said opening into the interior of the rail between the loops of said first channel, said rail and stile having panel supporting flanges abutting each other adjacent the joint between said stile and rail, and said rail having an opening therein to one side of the said flange of the stile, and metal key means inserted through said opening and through all of said loops and serving to draw said stile and rail into close engagement, substantially as set forth.

This specification signed and witnessed this 29th day of October, 1913.

JOHN G. WALLACE.
ALFRED BELL.

Witnesses:
JOHN B. KILBURN,
WM. J. EARNSHAW.